United States Patent [19]
Walker

[11] Patent Number: 5,159,729
[45] Date of Patent: Nov. 3, 1992

[54] TIE-DOWN DEVICE FOR CARGO AND THE LIKE

[76] Inventor: William T. Walker, 28 Tamela Dr., Little Rock, Ark. 72207

[21] Appl. No.: 729,333

[22] Filed: Jul. 12, 1991

[51] Int. Cl.⁵ .......................................... F16G 11/12
[52] U.S. Cl. .................................. 24/68 CD; 24/302; 248/499; 254/231
[58] Field of Search ................. 24/68 R, 68 CD, 298, 24/300, 301, 302; 248/499; 254/231; 403/43–45, 47

[56] References Cited

U.S. PATENT DOCUMENTS

| | | | |
|---|---|---|---|
| 1,828,350 | 10/1931 | Williams | 403/43 X |
| 3,279,759 | 10/1966 | Tallman | 24/68 CD |
| 3,719,377 | 3/1973 | Schultz et al. | 403/44 |
| 4,525,900 | 7/1985 | Muller et al. | 24/68 CD X |

Primary Examiner—James R. Brittain
Attorney, Agent, or Firm—Leonard Bloom

[57] ABSTRACT

A tie-down device for securing and holding down cargo and the like. The device includes a turnbuckle. A strap is provided having a first end and a second end that are secured to the turnbuckle, so as to loop back on itself and defining a loose strap and a stationary strap. A first hook is carried by the turnbuckle. A second hook is carried by the strap between the loose and stationary straps. Rotation of the turnbuckle in a first tightening direction wraps the loose strap around the stationary strap, shortening the loose strap for tightening the device and securing and holding down the cargo and the like and also locking the loose strap in place. Rotation of the turnbuckle in a second loosening direction unwraps the loose strap from around the stationary strap, lengthening the loose strap for untightening the device and unsecuring and releasing the cargo and the like. Safety features include providing the loose strap with a greater strength than the stationary strap, so that in the event of the breakage of the strap, the stationary strap will always be the strap to break and the loose strap wrapped around the stationary strap will restrain the stationary strap.

21 Claims, 11 Drawing Sheets

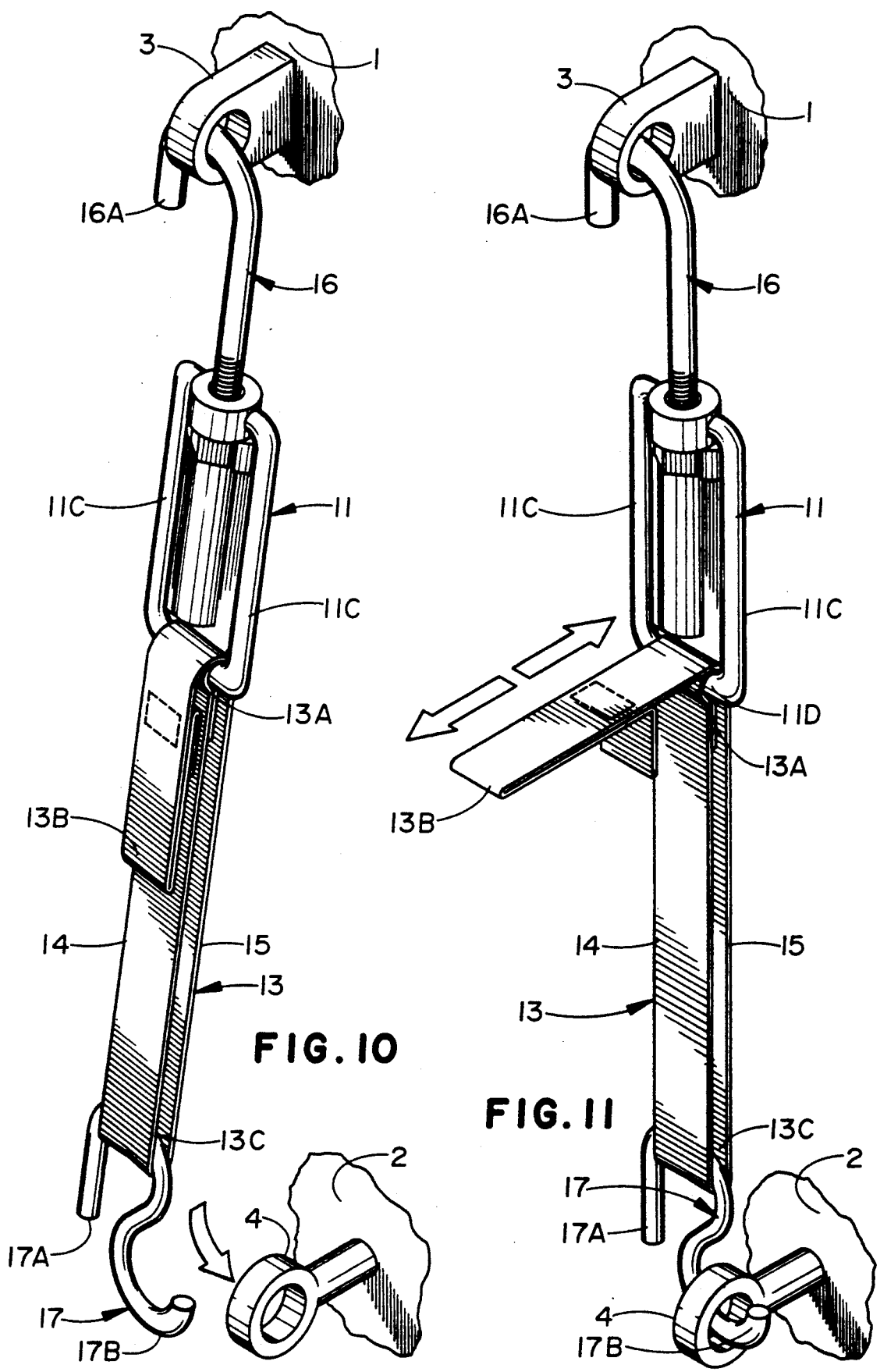

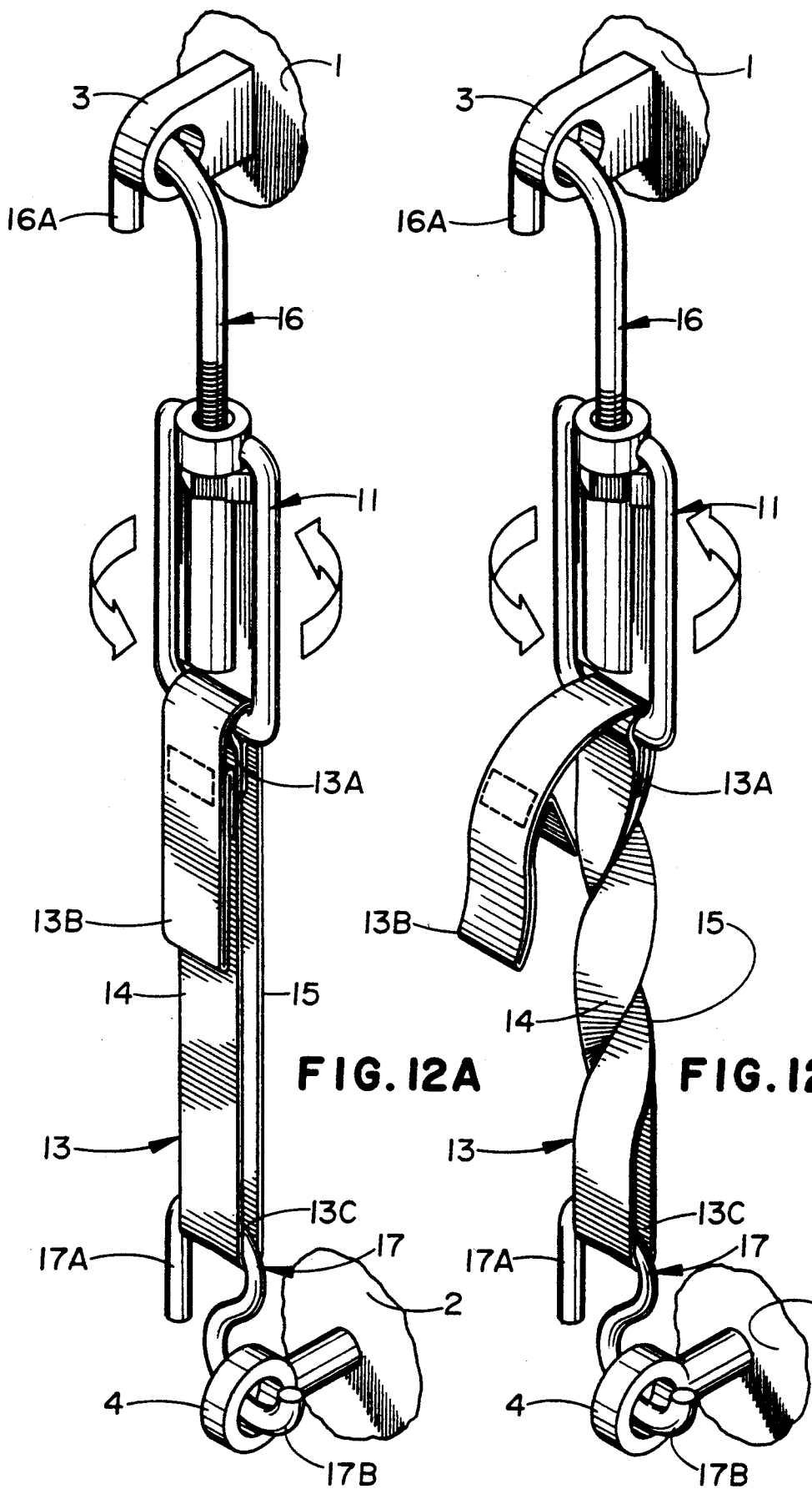

TIE-DOWN DEVICE FOR CARGO AND THE LIKE

FIELD OF THE INVENTION

The present invention relates to devices for securing cargo and the like and, in particular, to tie-down devices for securing and holding down cargo and the like, to moving vehicles, such as a motor vehicle or a trailer, and stationary objects such as a tarmac.

BACKGROUND OF THE INVENTION

When transporting bulky loads, such as cargo, boats, etc., from place to place with the aid of motor vehicles or motor vehicle drawn trailers, it is imperative to secure the load in order to prevent the load from becoming detached therefrom. In order to achieve this goal, numerous tie-down devices have been proposed. Examples of such devices, of which I am aware, are outlined as follows:

| Inventor(s) | Patent No. | Date of Issue |
| --- | --- | --- |
| Bolmes, et al. | 2,825,522 | 03/04/58 |
| Barker | 2,978,257 | 04/04/61 |
| Bhend | 3,072,376 | 01/08/63 |
| Tallman | 3,279,759 | 10/18/66 |
| Whitley, Jr. | 3,827,717 | 08/06/74 |
| Geeck, III | 4,954,031 | 09/04/90 |

Such tie-down devices are useful not only for directly securing the cargo and the like, but also for the securing covers, such as tarpaulins, over various cargo loads, such as gravel, so that the cargo load is secured by being held down.

It is also useful to utilize such devices to secure items, such as airplanes, to other types of elements, such as an airplane tarmac.

Such tie-down devices have always presented the problem of providing an arrangement by which they may be easily and gradually tensioned and detensioned during the use thereof. In order to achieve this goal, several arrangements, such as that disclosed in U.S. Pat. No. 4,525,900 issued to Muller, et al., have been disclosed. These arrangements have uniformly required the use of separate mechanical tensioning devices and arrangements, such as cranks, that can be expensive, bulky and difficult to use. None of these devices, of which I am aware, permit the tie-down device to be manually tightened and loosened without the need for additional mechanical devices.

The tie-down devices presently available, such as cam-over devices, have also always been problemic in that they can permit a sudden release of energy to occur in the event that the device breaks or otherwise fails. Such failure is not an uncommon situation, resulting from a variety of reasons, such as stresses that can occur from overtightening of the device. Sometimes, such a sudden release of energy can occur simply by the purposeful releasing of the tension thereon, such as when one is unsecuring the cargo and the like. Other times it can result from a failure of the device, such as when a strap breaks. None of the devices of which I am aware provide fail safe or safety features to prevent such sudden releases of energy. Consequently, physical injury or property damage can result from the use of such devices.

Accordingly, it can be seen that there remains a need for a tie-down device that is useful for securing and holding down cargo and the like, such as boats and tarpaulin covers, during the transportation thereof, which device is simple and easily to use, may be adequately tensioned and untensioned by hand without the use of additional arrangements that can encourage overtightening of the device, and which provides for failsafe arrangements, such that should the device either fail as a result of the stresses placed thereon or the tension thereon be purposefully released, the device will not experience a sudden release of energy that can result in physical injury or property damage.

SUMMARY OF THE INVENTION

It is a primary object of the present invention to provide a tie-down device for removably securing cargo and the like, to a motor vehicle, such as a trailer, or another suitable object, such as tarmac.

It is a further primary object of the present invention to provide such a tie-down device which has built in safety features for limiting or eliminating entirely intentional and unintentional sudden releases of energy that can result from unsecuring or failure of the device.

It is a still further primary object of the present invention to provide such a tie down device which permits the smooth, even and manual tightening and untightening thereof.

Still another object of the present invention is to provide a safer process for tying down and securing cargo and the like.

In accordance with the teachings of the present invention, a tie-down device is disclosed for securing and holding down cargo and the like. This device has a turnbuckle. A strap having first and second ends that are each secured to the turnbuckle are provided. Secured thusly, the strap loops back on itself at an intermediate portion that is located between the first and second ends thereof.

In this fashion, a stationary strap is defined between the first end of the strap that is secured to the turnbuckle and the intermediate portion of the strap and a loose strap is defined between the second end of the strap that is secured to the turnbuckle and the intermediate portion of the strap.

Separate means is carried by the turnbuckle and by the intermediate portion of the strap for securing the device on the cargo and the like to be held down and on an element to which the cargo and the like is to be secured.

In the arrangement of the present invention, rotation of the turnbuckle in a first tightening direction twists the loose strap, so that the loose strap is wrapped around the stationary strap as the loose strap is twisted for shortening the loose strap and for tightening the device and securing and holding down the cargo and the lock. In this fashion, the loose strap is locked in place, so that, in the event of failure of the device, the straps thereof are nonetheless maintained in place. Rotation of the turnbuckle in a second loosening direction untwists the loose strap, so that the loose strap is unwrapped from around the stationary strap as the loose strap is untwisted for untightening the device without a sudden loss of energy and safely unsecuring and releasing the cargo and the like.

Preferably, the means for securing the tie-down device includes a first hook that is carried by the turnbuckle and a second hook that is carried by the intermediate portion of the strap.

It is also preferred that the turnbuckle have a first end that has a longitudinal bore formed therein and the first hook include a portion that is received in the longitudinal bore. In this manner, during rotation of the turnbuckle in the first direction, the portion of the first hook that is at least partially received in the longitudinal bore is moved inwardly. Further in this manner, during rotation of the turnbuckle in the second direction, the first hook is moved outwardly, so that a portion of the first hook is at least partially removed from the longitudinal bore.

In a preferred arrangement, the longitudinal bore includes an internally-threaded portion and the portion of the first hook that is received therein is externally-threaded for matingly engaging one another. In this manner, rotation of the turnbuckle in the first tightening direction rotates the internally-threaded portion of the longitudinal bore therewith, so that the threaded portion of the first hook is moved at least partially inwardly into the longitudinal bore including the internally-threaded portion thereof. Further in this manner, rotation of the turnbuckle in the second loosening direction rotates the internally-threaded portion of the longitudinal bore concomitantly therewith, so that the threaded portion of the of the first hook is moved at least partially outwardly from the longitudinal bore including the internally-threaded portion thereof.

In another preferred arrangement, an internally-threaded nut is disposed in communication with the longitudinal bore and the portion of the first hook that is received therein is externally-threaded for matingly engaging one another. In this manner, rotation of the turnbuckle in the first tightening direction rotates the internally-threaded nut therewith, so that the threaded portion of the first hook is at least partially received in the longitudinal bore including the internally-threaded nut thereof. Further in this manner, rotation of the turnbuckle in the second loosening direction rotates the internally-threaded nut concomitantly therewith, so that the threaded portion of the of the first hook is at least partially removed from the longitudinal bore including the internally-threaded nut.

It is further preferred that the turnbuckle and the strap have strengths and that the ratio of turnbuckle strength to strap strength is substantially 7:1, such that the device will fail at the strap and not at the turnbuckle.

It is still further preferred that the stationary strap and the loose strap are secured to the turnbuckle, so that in the event of breakage of the strap, the stationary strap will always be the strap to break and the loose strap wrapped around the stationary strap during the use of the device will restrain the stationary strap in the event of breakage of the stationary strap.

Finally, it is preferred that the longitudinal bore further includes at least one square flat portion formed therein which becomes threaded as the threaded portion of the first hook is initially inserted. In this manner, a self-threaded portion is defined within the longitudinal bore which places a drag on the threading and unthreading movement of the first hook. This feature serves as a "friction lock" to keep the turnbuckle from untightening. This feature also assists in the first hook "backing off" if the device is overtightened, so that the device unwinds to a point where the device is still exerting pressure but is not overextended.

In another aspect of the present invention, a process is disclosed for tying down cargo and the like, so that the cargo and the like is secured and held in place. The process includes securing the first end and the second end of a strap to a turnbuckle. In this manner, the strap loops back on itself at an intermediate portion between the first and second ends thereof, thereby defining a stationary strap between the first end of the strap that is secured to the turnbuckle and the intermediate portion of the strap, and further thereby defining a loose strap between the second end of the strap that is secured to the turnbuckle and the intermediate portion of the strap. The turnbuckle is secured to either the cargo and the like to be held down or on an element to which the cargo and the like is to be secured. The intermediate portion of the strap is secured to either the cargo and the like to be held down or on an element to which the cargo and the like is to be secured. Rotating the turnbuckle in a first tightening direction wraps the loose strap around the stationary strap. In this fashion, the loose strap is shortened and tightened, securing and holding down the cargo and the like and further locking the loose strap in place. Rotating the turnbuckle in a second loosening direction unwraps the loose strap from around the stationary strap. In this fashion, the loose strap is lengthened and untightened, unsecuring and releasing the cargo and the like without a sudden loss of energy.

These and other features of the present invention will become readily apparent from a reading of the following description when taking in conjunction with the enclosed drawings.

BRIEF DESCRIPTION OF THE DRAWINGS

FIGS. 10—16 illustrates the use of the tie-down device of FIG. 1—8 to cargo and the like.

FIG. 10 illustrates the hooks of the tie-down device being secured for the thereof.

FIG. 11 illustrates the length of the strap being adjusted, so as to precisely fit the cargo and the like to be secured and held down.

FIGS. 12A and 12B illustrates the turnbuckle of the tie-down device being rotated for tightening the device for securing and holding down cargo and the like during the use thereof.

FIG. 13 illustrates the tie-down device secured in position for s cargo and the like.

FIG. 14 illustrates a pair of tie-down devices in use for securing a boat to a trailer.

FIGS. 15A and 15B illustrates the turnbuckle of the tie-down device being rotated for untightening the device for unsecuring and cargo and the like after the use thereof.

FIG. 16 illustrates the hooks of the tie-down device being removed for the cargo and the like that was held down thereby.

DESCRIPTION OF PREFERRED EMBODIMENTS

Figure 1:
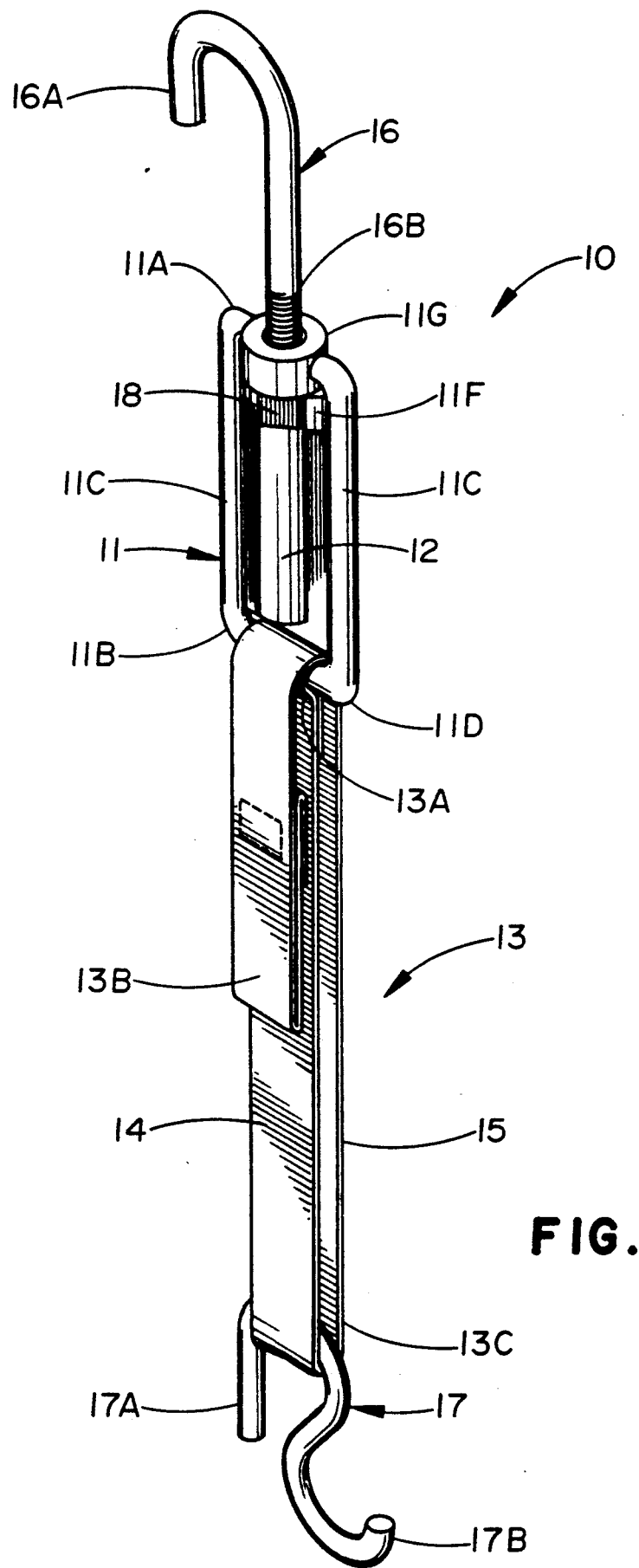
FIG. 1 is a perspective view of the preferred embodiment of the of the present invention.
Figure 2:
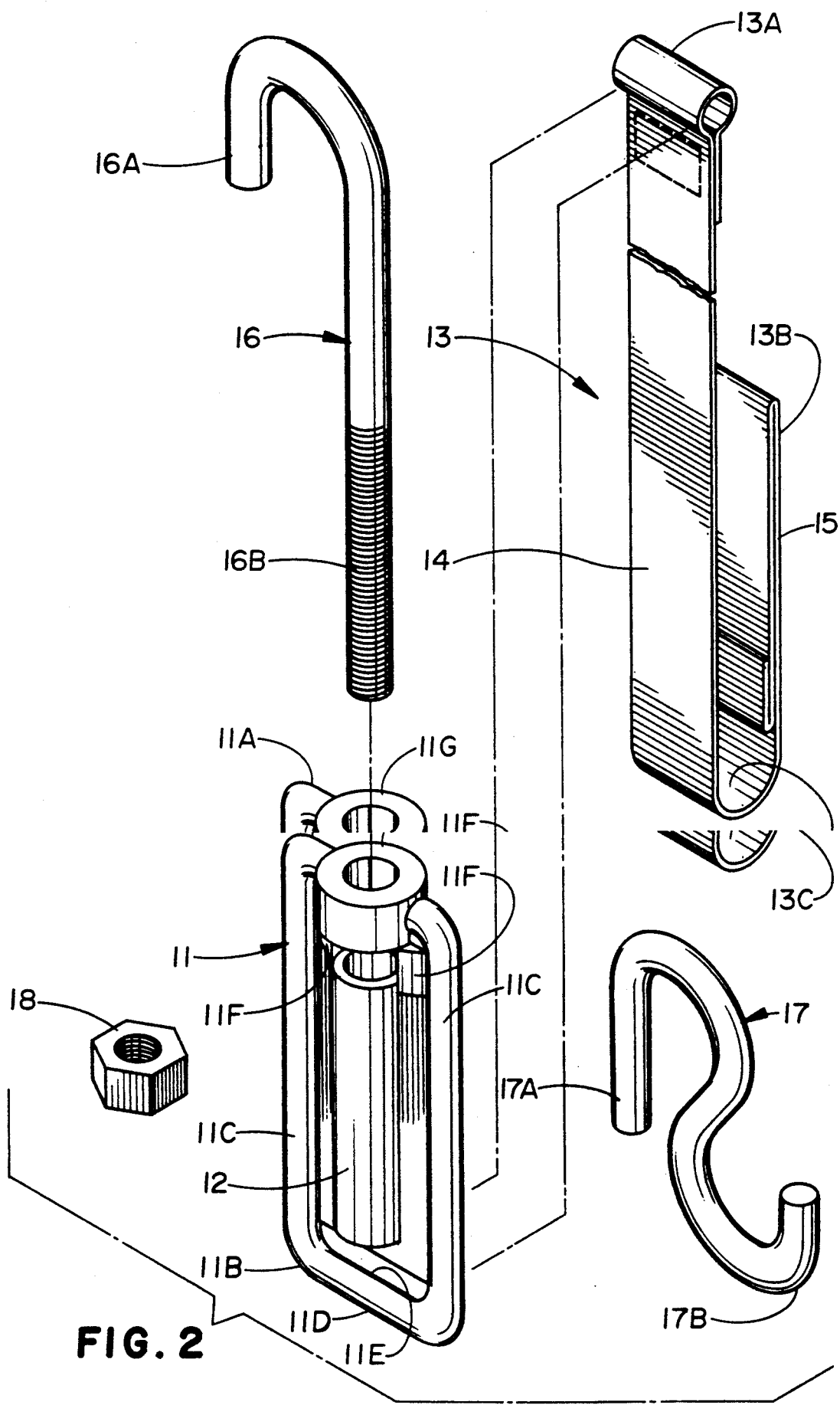
FIG. 2 is an exploded view of the tie-down device of FIG. 1.
Figure 5:
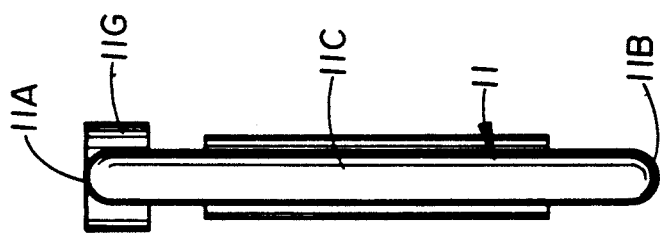
FIG. 5 is an end view corresponding to FIG. 4.
Figure 4:
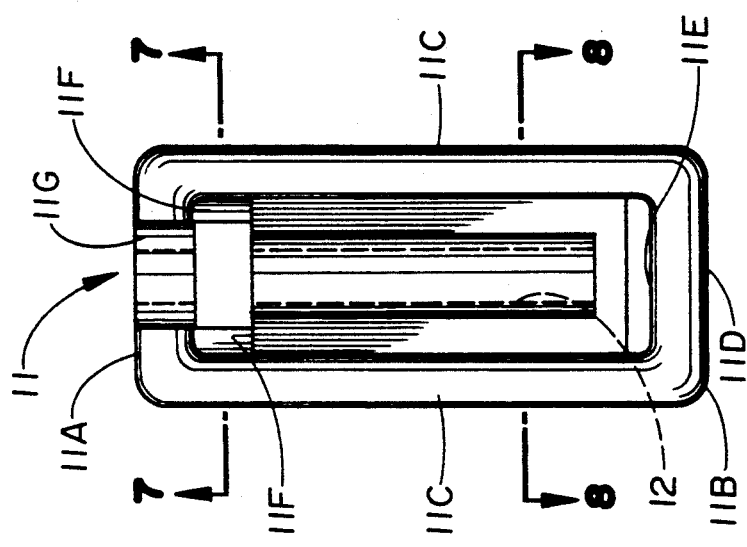
FIG. 4 is a side view of the turnbuckle of the tie-down device of FIG. 1, with the strap, turnbuckle and nut removed therefrom of sake of clarity.
Figure 3:
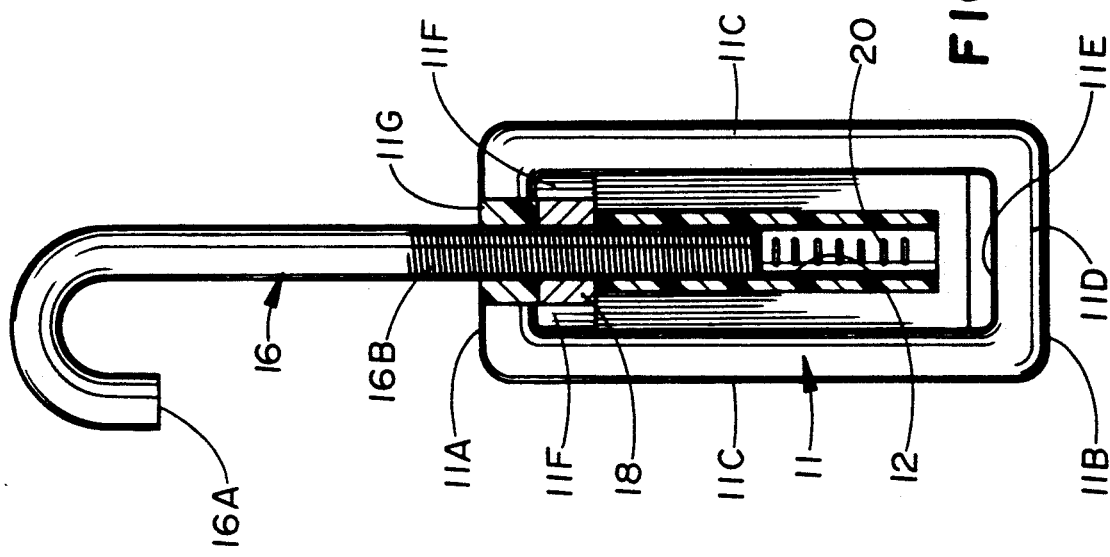
FIG. 3 is a cross-section view of the turnbuckle of the tie-down device of FIG. 1.
Figure 6:
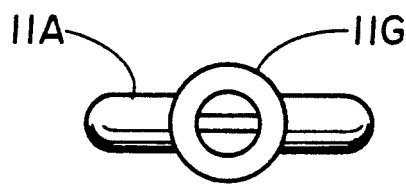
FIG. 6 is a top view of the turnbuckle of FIG. 4.
Figure 7:
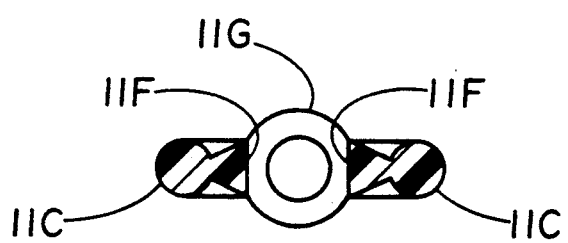
FIG. 7 is a cross-section view of the turnbuckle taken along lines 7—7 of FIG. 4.
Figure 8:
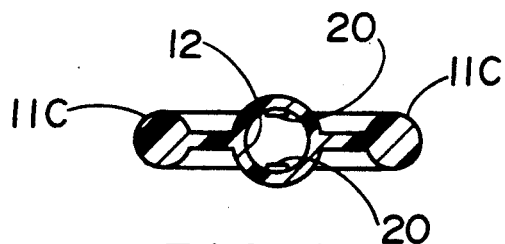
FIG. 8 is a cross-section view of the turnbuckle taken along lines 8—8 of FIG. 4.

With reference now to the drawings, and in particular to FIGS. 1-9, the tie-down device 10 of the present invention is now discussed.

The device 10 includes a turnbuckle 11 that has a first end 11a and a second opposite end 11b. The first end 11a of the turnbuckle 11 has a longitudinal bore 12 formed therein. Preferably, this longitudinal bore 12 is formed extending along the longitudinal axis of the turnbuckle 11 and having its open end oriented towards the first end 11a (away from the second opposite end 11b) of the turnbuckle 11.

Preferably, the turnbuckle 11 is fabricated from a high-impact resistant material that is not brittle. It is further preferred that this material be able to be self-threaded. An example of such a material is NYLON 66 (a registered mark of the DuPont Corporation of Wilmington, Del.).

It is noted that the turnbuckle 11 also includes both sides of the turnbuckle 11 have respective rod-like structures 11c formed thereon. Preferably, the structures 11c are ⅜" in size. Rod structures 11c are provided for being gripped for rotating the turnbuckle 11, as desired. In this regard, it is further preferred that the rod-like structures 11c be textured for providing a better grip.

A strap 13 is provided having a first end 13a and a second opposite end 13b. The first end 13a of the strap 13 is secured to the second end 11b of the turnbuckle 11. This is done by looping the first end 13a around a portion (a bar 11d) of the second end 11b of the turnbuckle 11 and then sewn closed. The second end 13b of the strap 13 is also secured to the second end 11b of the turnbuckle 11. In this fashion, the strap 13 loops back on itself at an intermediate portion 13c that is located substantially between the first and second ends 13a and 13b, respectively.

It is preferred that the second end 13b of the strap 13 be adjustably secured to the second end 11b of the turnbuckle 11. This is achieved by passing the second end 13b of the strap 13 through a slot 11e formed in the second end 11b of the turnbuckle 11 and then looping the second end 13b of the strap 13 on itself where it is sewn, so as to be double width, too large to pass through the said slot 11e. In this fashion, second end 13b of the strap 13 is adjustably secured to the turnbuckle 11, so that the length of the strap 13 may be adjusted as desired by sliding the as much as the remainder of the strap 13 as desired through the slot 11e, so that the strap 13 precisely fits the dimensions of the cargo and the like to be secured and held down.

A stationary strap 14 is defined between the first end 13a of the strap 13 that is secured to the turnbuckle 11 and the intermediate portion 13c. A loose strap 15 is defined between the second end 13b of the strap 13 that is secured to the turnbuckle 11 and the intermediate portion 13c.

A first hook 16 is carried by the turnbuckle 11. It is preferred that this hook 16 be a J-hook with a hook portion 16a and an opposite externally-threaded portion 16b. In such a case, the opposite threaded portion 16b of the hook 16 is at least partially received in the bore 12 and is secured thereby to the turnbuckle 11. In this fashion, the hook portion 16a of the first hook 16 may be removably hooked or otherwise secured on either the cargo and the like to be held down thereby or on an element, such as a tarpaulin or the bed of a truck, to which the cargo and the like is to be secured.

A second hook 17 is carried by the intermediate portion 13c of the strap 13. It is preferred that this hook 17 be an S-hook with a pair of opposite hook portions 17a. In this fashion, one of the hook portions 17a of the second hook 17 is hooked on the strap 13 at the intermediate portion 13c thereof while the other of said hook portions 17a of the second hook 17 may be removably hooked on either the cargo and the like to be held down or on an element, such as a tarpaulin or the bed of a truck, to which the cargo and the like is to be secured.

Formed as described above, the turnbuckle 11 may be rotated in either a first tightening direction for tightening the device 10 or in a second loosening (or untightening) direction for untightening the device 10 and unsecuring and releasing the cargo and the like that was secured and held down thereby.

With particular reference now to FIGS. 1-8, the turnbuckle 11 is seen to further include an internally-threaded nut 18 that is disposed in communication with the longitudinal bore 12, so as to rotate concomitantly with the turnbuckle in both the first tightening direction and the second loosening direction. If desired, this nut 18 may be either interposed in the longitudinal bore 12 or disposed at one end thereof. The opposite portion 16b of the first hook 16 is externally-threaded for matingly-engaging the nut 18. In this fashion, the threaded portion 16b of the first hook 16 is threadably removably received through the threaded nut 18 and at least partially longitudinally received in the longitudinal bore 12. Disposed thusly, rotation of the turnbuckle 11 in the first tightening direction moves the threaded portion 16b of the first hook 16 inwardly and rotation of the turnbuckle 11 in the second loosening direction moves the threaded portion 16b of the first hook 16 outwardly.

The nut 18 is restrained in place by restraints 11f that are formed in the turnbuckle 11. Restraints 11f are located on either side of the nut 18 and, in this respect restrain the nut 18 therebetween.

Figure 9:
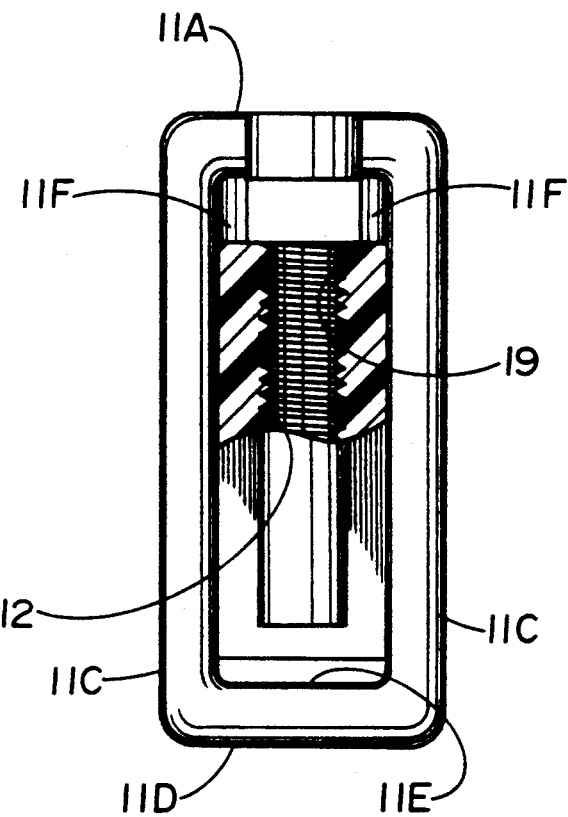
FIG. 9 is a cross-section view of the first end of another turnbuckle for use in the tie-down device of the present invention to reveal the longitudinal bore having a threaded portion formed therein.

Alternatively, with reference to FIG. 9, the longitudinal bore 12 of the turnbuckle 11 includes an internally-threaded portion 19 that rotates concomitantly with the turnbuckle 11 in both the first tightening direction and the second loosening direction. The opposite portion 16b of the first hook 16 is externally-threaded for matingly-engaging the threaded portion 19. In this fashion, the threaded portion 16b of the first hook 16 is threadably removably received through the threaded portion 19 of the bore 12 and at least partially longitudinally received in the longitudinal bore 12. Disposed thusly, once again rotation of the turnbuckle 11 in the first tightening direction moves the threaded portion 16b of the first hook 16 inwardly and rotation of the turnbuckle 11 in the second loosening direction moves the threaded portion 16b of the first hook 16 outwardly.

It is noted that at least a portion of the longitudinal bore 12 is formed so as to be tapered, having a larger diameter near the open end thereof (where the nut 18 would be located) than near the closed end (where the strap 13 would be located) thereof. In this fashion, as the first hook 16 is moved (threaded) farther into the bore 12 formed in the turnbuckle 12, said hook 16 is progressively tightened in the turnbuckle 11. In this regard, it is preferred that the tapered portion of the bore 12 be that portion which receives the portion 16b of the hook 16 therein.

It is also noted that the turnbuckle 11 may also include arrows or the words "tighten" and "loosen" being formed or otherwise marked thereon. This is provided, as will be discussed below, because the strap 13 may used in either direction (for example, with the first hook 16 oriented either upwardly or downwardly). By referring to such a marking(s), the user may be able to know exactly in which direction the turnbuckle 11 must be rotated for tightening and untightening the device 10.

Finally, the turnbuckle 11 may have a collar 11g formed therein being aligned with the longitudinal bore 12. The collar 11g is disposed to receive the end 16b of the hook 16 therethrough in order to aid in guiding the end 16b of the hook into the bore 12 and, if provided, the nut 18.

With further reference now to FIGS. 10–16, the operation of the devices 10 illustrated in FIGS. 1-9, (the process for tying down and securing cargo and the like) and discussed above, are now described in reference to the use of the tie-down device 10 to secure a boat 1 to a trailer 2.

After positioning the boat 1 on the trailer 2 as needed or desired, the device 10 is first secured in place. As illustrated in FIG. 10, in this process, with the threaded portion 16b of the first hook 16 removably secured in the longitudinal bore 12 of the turnbuckle 11, the hook portion 16a of the first hook 16 is hooked on or otherwise secured to the boat 1, such as the hook portions 16a being looped through eyelets 3 or apertures on the boat 1 provided for this purpose. Similarly, with one of the hook portions 17a of the second hook 17 hooked on the intermediate portion 13c of the strap 13, the other hook portion 17a of the second hook 17 is hooked on, or otherwise secured to, the bed of a trailer powered by a moving vehicle, by being looped through eyelets 4 or apertures formed in the trailer for this purpose.

Next, with reference to FIG. 11, after securing of the device 10, as described above, the second end 13b of the strap 13 is then pulled for adjusting the length of the strap 13. In this fashion, the length of the strap 13 may be adjusted as desired, so as to precisely fit the dimensions of the cargo and the like to be secured and held down.

Referring now to FIGS. 12A and 12B, after placement and adjustment of the device 10, the turnbuckle 11 is rotated in the first tightening direction to twist the loose strap 15, so that the loose strap 15 is wrapped around the stationary strap 14 as the loose strap 15 is twisted. In this fashion, the loose strap 15 is shortened as the loose strap 15 is twisted and wrapped around the stationary strap 14 for tightening the device 10 and securing and holding down the cargo and the like. Further in this fashion, the loose strap 15 is restrained or locked in place.

Figure 13:
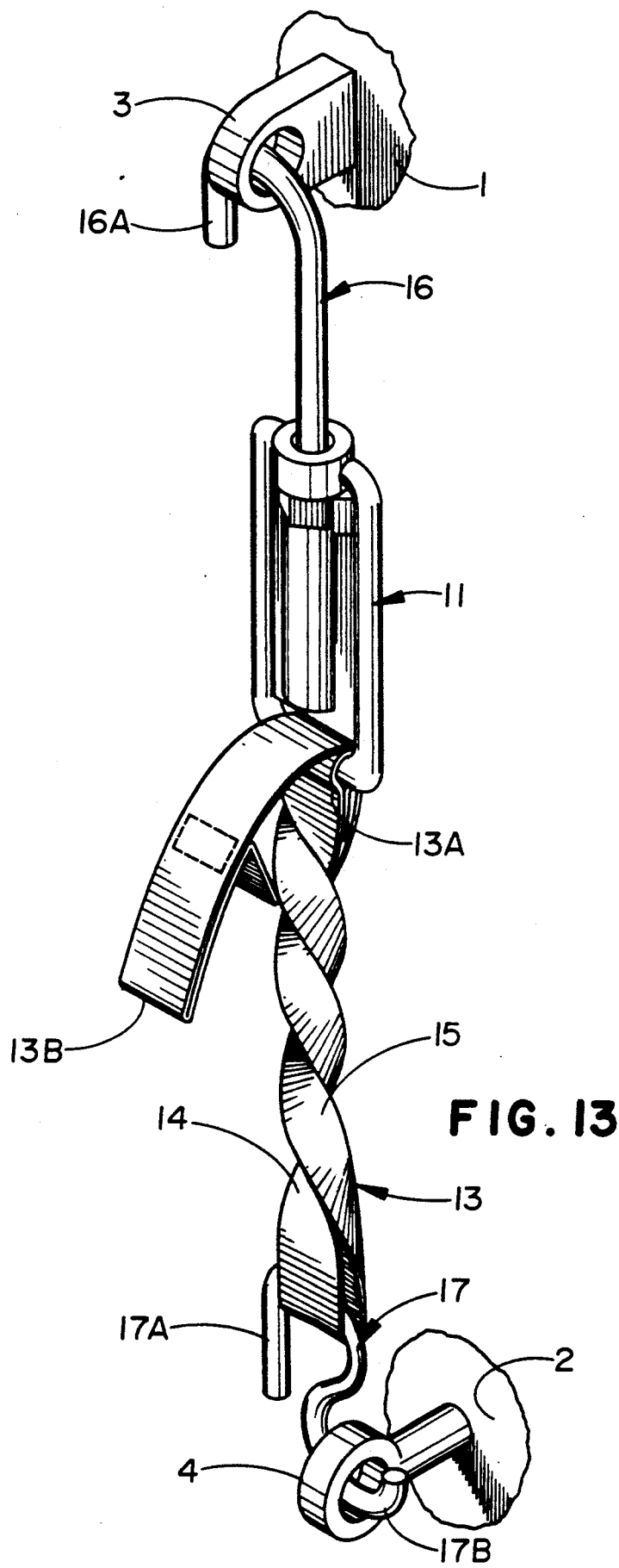

It is further noted that during rotation of the device 10 in the first tightening direction, the opposite portion 16b of the first hook 16 is moved inwardly and at least partially received in the longitudinal bore 12. Such a feature further shortens the device 10 for tightening the device 10. Secured as described above, the device 10 is now secured in position for securing cargo and the like (FIG. 13).

Figure 14:
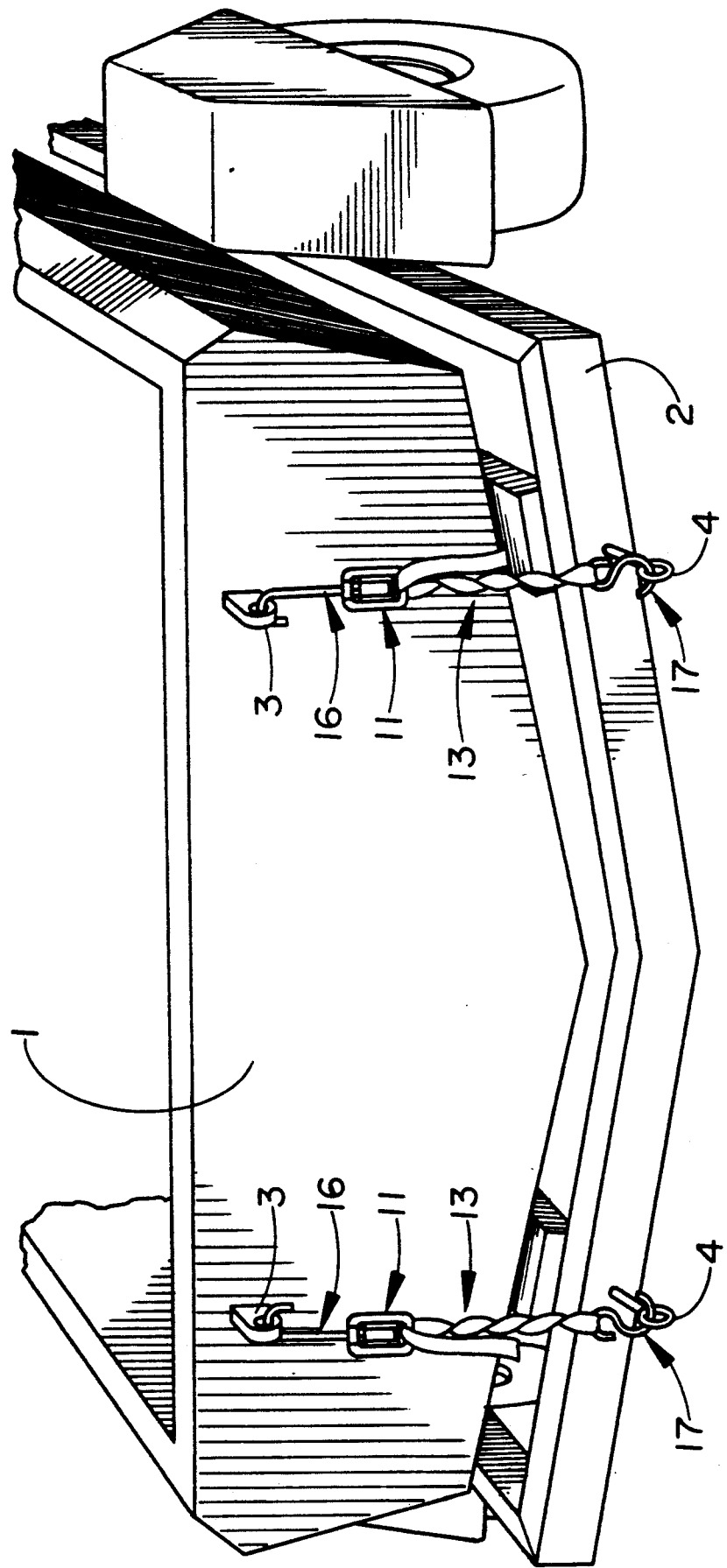
Figure 15:
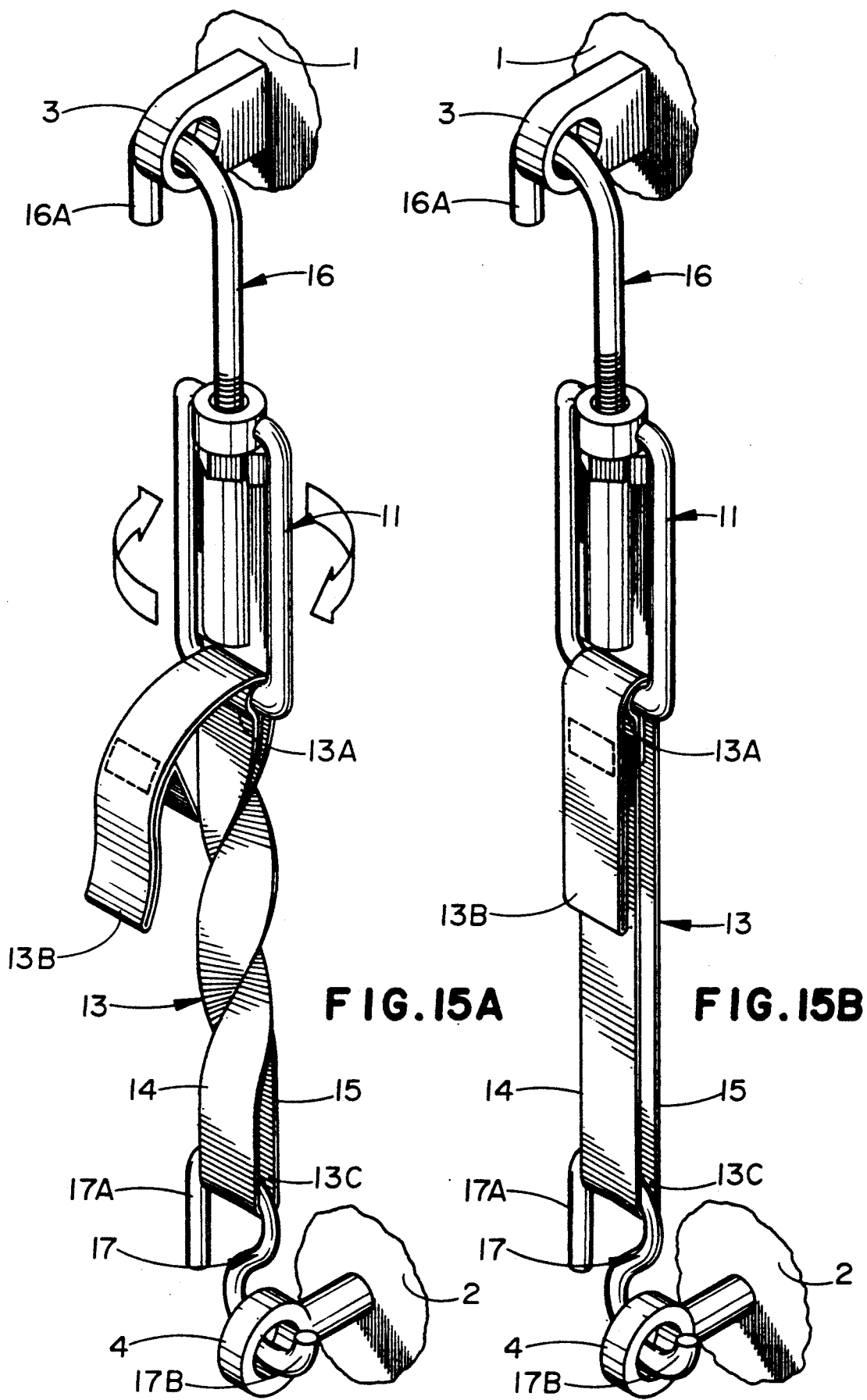

With reference to FIG. 14, the device 10 is seen in action. In this respect, two such devices 10 are illustrated being used for securing a boat to a trailer.

Referring now to FIGS. 15A and 15B, the unsecuring of the device 10 is now discussed. When it is desired to unsecure the device 10, the turnbuckle 11 is rotated in the second loosening direction and the loose strap 15 is untwisted, so that the loose strap 15 is unwrapped from around the stationary strap 14 as the loose strap 15 is untwisted. In this fashion, the loose strap 15 is lengthened as the loose strap 15 is untwisted for untightening the device 10 without a sudden release of energy. This prevents the device from experiencing a sudden release of energy, thereby permitting the safe unsecuring and releasing of the cargo and the like.

It is further noted that during rotation of the device 10 in the second loosening direction, the opposite portion 16b of the first hook 16 is moved outwardly, being at least partially removed from the longitudinal bore 12. Such a feature further lengthens the device 10 for untightening or loosening the device 10.

Figure 16:
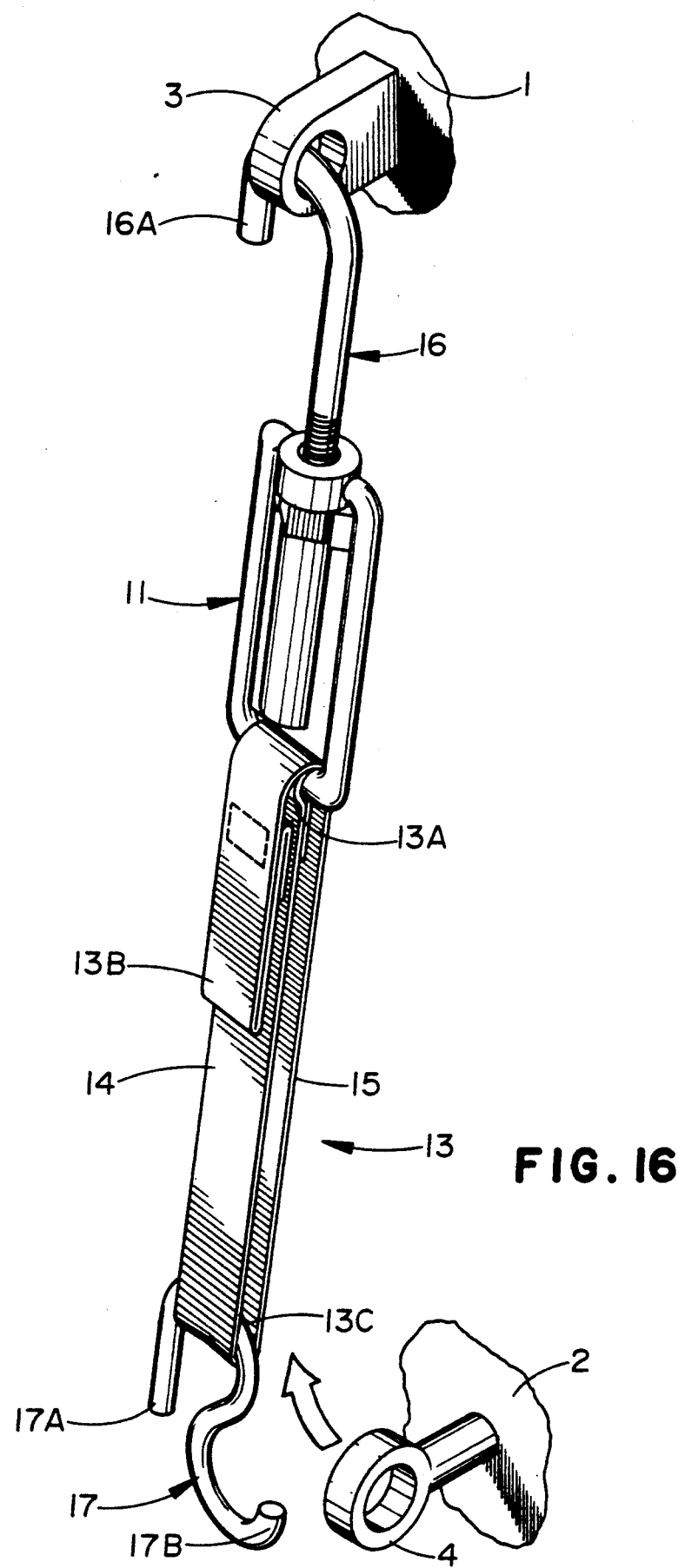

Having been unsecured, the hook portion 16a of the first hook 16 and the hook portions 17a of the second hook 17 may be unhooked, and the cargo and the like unsecured and released (FIG. 16).

Figures 17, 18:
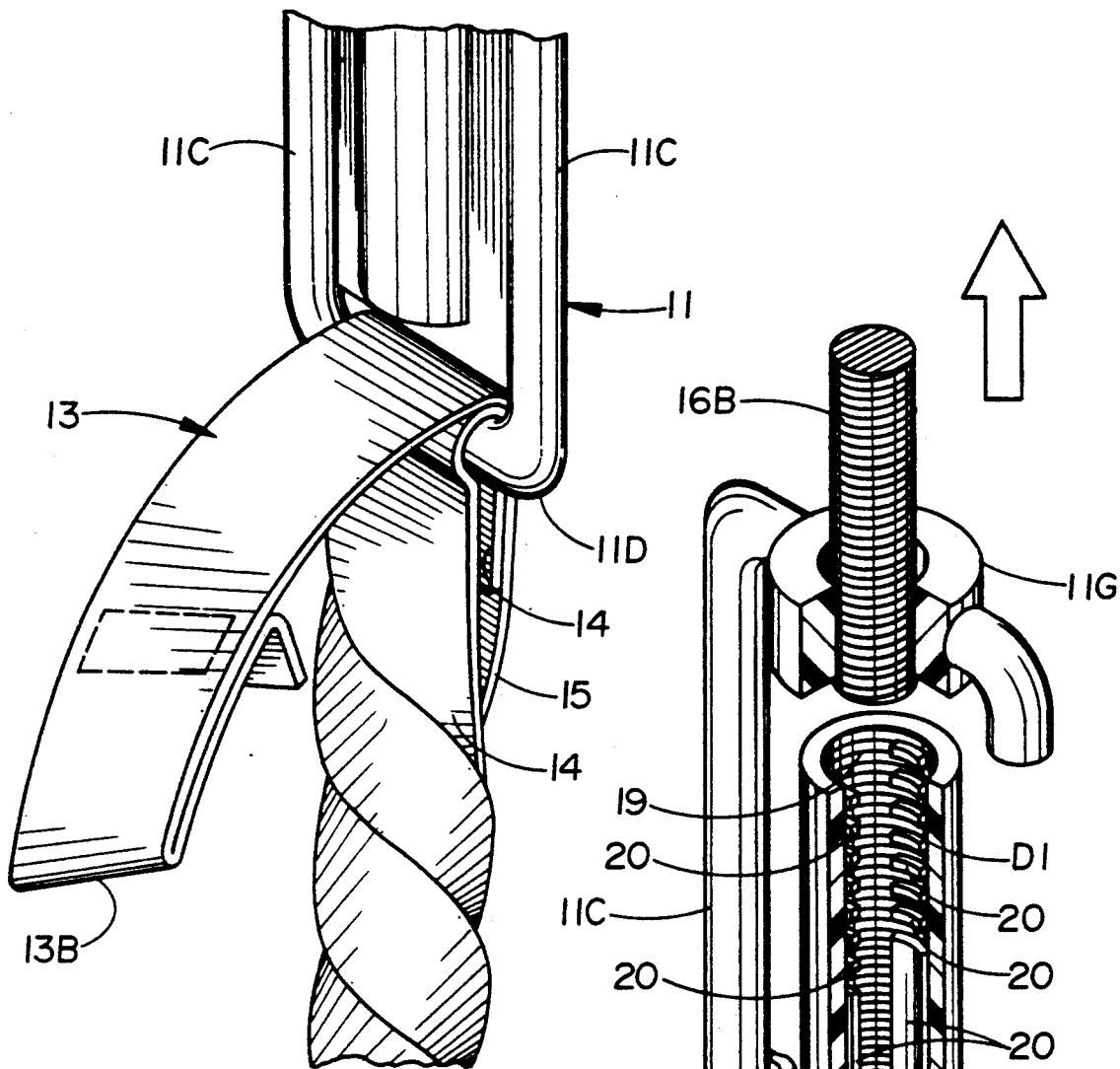
FIG. 17 illustrates a first safety feature of the tie-down device of the present invention, wherein in the event of breakage of the stationary strap, the stationary strap is retained and secured in place the loose strap.
FIG. 18 illustrates a second safety feature of the tie-down device of the present invention, wherein square flat portions are formed in the longitudinal bore that become self-threaded when the hook is threaded therein, placing a drag on the hook and serving as a friction lock to keep the turnbuckle from loosening as well as assisting the first hook in backing off if the device is overtightened.

With reference now to FIG. 17, another of the safety features is illustrated. In this feature, the loose strap 15 and the stationary strap 14 are secured to the turnbuckle 11, so that in the event of breakage of the strap 13, the stationary strap 14 will always be the strap 13 to break, the break probably occurring at the sewn portion where the first end 13a is secured to the turnbuckle 11. The loose strap 15 wrapped around the stationary strap 14 during use of the device 10 will restrain the stationary strap 14 in the event of breakage of the stationary strap 14. There may be some "give" or stretch, but the tie-down device 10 will not open. In this fashion, the cargo and the like will still be restrained even if the device fails.

Another of the safety feature of the present invention includes the turnbuckle 11 and the strap 13 each having respective strengths. The ratio of turnbuckle strength to strap strength is substantially 7:1. In this fashion, in the event of failure of the device 10, such failure will occur at the strap 13 (and, more particularly at the first end 13a of the strap 13) and not at the turnbuckle 11.

With reference now to FIG. 18, one of the safety features of the present invention is illustrated. In this embodiment, the longitudinal bore 12 (and, if the longitudinal bore 12 includes an internally-threaded portion 19, said internally-threaded portion 19) includes at least one square unthreaded flat portion 20 formed therein. As the threaded end 16b of the first hook 16 is initially inserted into the bore 12 and through the flat portions 20, these flat portions 20 become self-threaded. In this fashion, a self-threaded portion is defined within the longitudinal bore which places a drag on the threading and unthreading movement of the first hook 16. Such an arrangement serves as a "friction lock" to keep the turnbuckle 11 from untightening and assists in the first hook 1 "backing off" if the device is overtightened, so that the device 10 unwinds to a point where the device 10 is still exerting pressure but is not overextended.

The tapered feature of the bore 12 further contributes to the safety of the present invention. The diameter d1 of the bore near the nut 18 is greater than the diameter d2 of the bore near the closed end. Thus, when the first hook 16 is threaded into the bore 12, the first hook 16 is held securely therein against accidental unthreading.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A tie-down device for securing and holding down cargo and the like, comprising: a turnbuckle, a strap having a first end and a second end, the first and second ends being secured to the turnbuckle, such that the strap loops back on itself at an intermediate portion between the first and second ends thereof, thereby defining a stationary strap between the first end of the strap that is secured to the turnbuckle and the intermediate portion of the strap and a loose strap between the second end of the strap that is secured to the turnbuckle and the intermediate portion of the strap, means carried by the turnbuckle for securing the device on either the cargo and the like to be held down or on an element to which the cargo and the like is to be secured, means carried by the intermediate portion of the strap for securing the device on either the cargo and the like to be held down or on an element to which the cargo and the like is to be secured, wherein rotation of the turnbuckle in a first tightening direction wraps the loose strap around the stationary strap, thereby shortening the loose strap for tightening the device and securing and holding down the cargo and the like, and further thereby locking the loose strap in place, and further wherein rotation of the turnbuckle in a second loosening direction unwraps from around the stationary strap untightening the device without a sudden loss of energy and safely unsecuring and releasing the cargo and the like.

2. The device of claim 1, wherein the loose strap and the stationary strap are secured to the turnbuckle, so that in the event of breakage of the strap, the stationary strap will always be the strap to break, whereby the loose strap wrapped around the stationary strap during use of the device will restrain the stationary strap in the event of breakage of the stationary strap.

3. A tie-down device for securing and holding down cargo and the like, the tie-down device comprising: a turnbuckle; a strap having a first end secured to the turnbuckle, the strap further having a second end being secured to the turnbuckle, such that the strap loops back on itself at an intermediate portion between the first and second ends thereof, thereby defining a stationary strap between the first end of the strap that is secured to the turnbuckle and the intermediate portion of the strap and a loose strap between the second end of the strap that is secured to the turnbuckle and the intermediate portion of the strap; a first hook carried by the turnbuckle, the first hook including a hook portion that may be removably hooked on either the cargo and the like to be secured and held down or on an element by which the cargo and the like is to be secured and held down; and a second hook carried by the intermediate portion of the strap, the second hook including a hook portion that may be removably hooked on either the cargo and the like to be secured and held down or on an element by which the cargo and the like is to be secured and held down; wherein rotation of the turnbuckle in a first tightening direction wraps the loose strap around the stationary strap, thereby progressively shortening the loose strap as the turnbuckle is rotated in the first direction for tightening the device and securing and holding down the cargo and the like, and further thereby locking the loose strap in place; and further wherein rotation of the turnbuckle in a second loosening direction unwraps the loose strap from around the stationary strap, thereby progressively lengthening the loose strap as the turnbuckle is rotated in the second direction for untightening the device without sudden loss of energy and safely unsecuring and releasing the cargo and the like.

4. The device of claim 3, further comprised of: the turnbuckle having a first end and a second opposite end, the first end of the turnbuckle having a longitudinal bore formed therein an internally-threaded nut disposed in communication with the longitudinal bore; the first hook further including an opposite portion opposite of the hook portion, said opposite portion being removably received in the longitudinal bore, such that during rotation of the turnbuckle in the first tightening direction, the opposite portion of the first hook is at least partially and progressively received in the longitudinal bore, whereby the device is progressively shortened for tightening the device and securing and holding down cargo and the like, and further such that during rotation of the turnbuckle in the second loosening direction, the opposite portion of the first hook is at least partially and progressively removed from the longitudinal bore, whereby the device is progressively lengthened for tightening the device and unsecuring and releasing the cargo and the like; the opposite portion of the first hook being externally-threaded for matingly engaging the nut as the turnbuckle is rotated, so that the threaded portion of the first hook is progressively threadably removably received through the threaded nut and at least partially longitudinally removably received in and removed from the longitudinal bore; wherein rotation of the turnbuckle in the first tightening direction rotates the nut concomitantly therewith, so that the threaded portion of the first hook is at least partially progressively received in the longitudinal bore as the loose strap is wrapped around the stationary strap, whereby the device is progressively lengthened for tightening the device and securing and holding down the cargo and the like; and further wherein rotation of the turnbuckle in the second loosening direction rotates the nut concomitantly therewith, so that the threaded portion of the first hook is at least partially progressively removed from the longitudinal bore as the loose strap is unwrapped from around the stationary strap, whereby the device is progressively lengthened for untightening the device and safely unsecuring and releasing the cargo and the like.

5. The device of claim 4, wherein the longitudinal bore includes at least one square flat portion formed therein which becomes threaded as the threaded portion of the first hook is initially inserted therethrough, whereby a self-threaded portion is defined within the longitudinal bore which places a drag on the movement of the first hook, thereby serving as a "friction lock" to keep the turnbuckle from untightening, and further thereby assisting in the first hook "backing off" if the device is overtightened, so that the loose strap unwinds to a point where the device is still exerting pressure but is not overextended.

6. The device of claim 3, further comprised of: the turnbuckle having a first end and a second opposite end, the first end of the turnbuckle having a longitudinal bore formed therein, the longitudinal bore of the turnbuckle including an internally-threaded portion; and the first hook further including an opposite portion that is opposite of the hook portion, said opposite portion being removably received in the longitudinal bore, such that during rotation of the turnbuckle in the first tightening direction, the opposite portion of the first hook is at least partially and progressively received in the longitudinal bore, whereby the device is progressively shortened for tightening the device and securing and holding down cargo and the like, and further such that during rotation of the turnbuckle in the second loosening direction, the opposite portion of the first hook is at least partially and progressively removed from the longitudinal bore, whereby the device is progressively lengthened for untightening the device and unsecuring and releasing cargo and the like; the opposite portion of the first hook being externally-threaded for matingly engaging the threaded portion of the bore as the turnbuckle is rotated, so that the threaded portion of the first hook is progressively threadably removably received through the threaded portion of the longitudinal bore and at partially longitudinally removably received in and removed from the longitudinal bore; wherein rotation of the turnbuckle in the first tightening direction rotates the internally-threaded portion of the longitudinal bore concomitantly therewith, so that the threaded portion of the first hook is at least partially progressively received in the longitudinal bore including the internally-threaded portion thereof as the loose strap is wrapped around the stationary strap, whereby the device is progressively shortened for tightening the device and securing and holding down the cargo and the like; and further wherein rotation of the turnbuckle in the second loosening direction rotates the internally-threaded portion of the longitudinal bore concomitantly therewith, so that the threaded portion of the first hook is at least partially progressively removed from the longitudinal bore as the loose strap is unwrapped from around the stationary strap, whereby the device is progressively lengthened for untightening the device and safely unsecuring and releasing the cargo and the like.

7. The device of claim 6, wherein the internally-threaded portion of the longitudinal bore includes at least one square flat portion which becomes threaded as the threaded portion of the first hook is initially inserted therethrough, whereby a self-threaded portion is defined within the longitudinal bore which places a drag on the movement of the first hook, thereby serving as a "friction lock" to keep the turnbuckle from untightening, and further thereby assisting in the first hook "backing off" if the device is overtightened, so that the loose strap unwinds to a point where the device is still exerting pressure but is not overextended.

8. The device of claim 3, further comprised of: the turnbuckle having a first end and a second opposite end, the first end of the turnbuckle having a longitudinal bore formed therein; an internally-threaded nut interposed in the longitudinal bore, such that rotation of the turnbuckle in the first tightening and second loosening directions concomitantly rotates the threaded nut therewith; and the first hook further including an opposite portion being opposite to the hook portion, said opposite portion being externally-threaded so as to matingly engage the threaded nut as the turnbuckle is rotated, so that the threaded portion of the first hook is progressively, threadably removably received through the threaded nut and at least partially longitudinally removably received in and removed from the longitudinal bore wherein during rotation of the turnbuckle, including the threaded nut, in the first tightening direction, the threaded portion of the first hook is at least partially progressively received in the longitudinal bore and through the threaded nut interposed therein as the loose strap is wrapped around the stationary strap, whereby the device is progressively shortened of tightening the device and securing and holding down the cargo and the like; and further wherein during rotation of the turnbuckle, including the threaded nut, in the second loosening direction, the threaded portion of the first hook is at least partially progressively removed from the longitudinal bore as the loose strap is unwrapped from around the stationary strap, whereby the device is progressively lengthened for untightening the device and safely unsecuring and releasing the cargo and the like.

9. The device of claim 8, wherein the longitudinal bore further includes at least one square flat portion formed therein which becomes threaded as the threaded portion of the first hook is initially inserted therethrough, whereby a self-threaded portion is defined within the longitudinal bore which places a drag on the movement of the first hook, thereby serving as a "friction lock" to keep the turnbuckle from untightening, and further thereby assisting in the first hook "backing off" if the device is overtightened, so that the loose strap unwinds to a point where the device is still exerting pressure but is not overextended.

10. The device of claim 3, wherein the turnbuckle has a first end and a second opposite end, and wherein the first end and the second end of the strap are each secured to the second opposite end of the turnbuckle.

11. The device of claim 3, wherein the first hook is a J-hook.

12. The device of claim 3, wherein the second hook is an S-hook.

13. The device of claim 3, further comprised of: the turnbuckle having a first end and a second opposite end, the first hook being carried by the first end of the turnbuckle; and the first end and the second end of the strap being secured to the second end of the turnbuckle.

14. The device of claim 13, wherein the second end of the strap is adjustably secured to the second end of the turnbuckle, such that the length of the strap may be adjusted as desired, so as to precisely fit the dimensions of the cargo and the like to be secured and held-down.

15. The device of claim 3, wherein the turnbuckle has a strength and the strap has a strength, and further wherein the ratio of turnbuckle strength to strap strength is substantially 7:1, such that the device will fail at the strap and not at the turnbuckle.

16. A tie-down device for securing and holding down cargo and the like, the tie-down device comprising: a turnbuckle having a first end and a second opposite end, the first end of the turnbuckle having a longitudinal bore formed therein, the longitudinal bore of the turnbuckle including an internally-threaded portion; a strap having a first end secured to the turnbuckle, the strap further having a second end being secured to the turnbuckle, such that the strap loops back on itself at an intermediate portion between the first and second ends thereof, thereby defining a stationary strap between the first end of the strap that is secured to the turnbuckle and the intermediate portion of the strap and a loose strap between the second end of the strap that is secured to the turnbuckle and the intermediate portion of the strap; a first hook carried by the turnbuckle, the first hook including a hook portion that may be removably hooked on either the cargo and the like to be secured and held down or on an element to which the cargo and the like is to be secured and held down, the first hook further including an opposite portion, the opposite portion of the first hook being externally-threaded for matingly engaging the threaded portion of the bore as the turnbuckle is rotated, so that the threaded portion of the first hook is progressively threadably removably received through the threaded portion of the longitudinal bore and at least partially longitudinally removably received in and removed from the longitudinal bore; a second hook carried by the intermediate portion of the strap, the second hook including a hook portion that may be removably hooked on either the cargo and the like to be secured and held down or on an element by which the cargo and the like is to be secured and held down; wherein rotation of the turnbuckle in a first tightening direction rotates the internally-threaded portion of the longitudinal bore concomitantly therewith, so that the threaded portion of the first hook is at least partially progressively received in the longitudinal bore including the internally-threaded portion thereof and, and further so that the loose strap is wrapped around the stationary strap, thereby progressively shortening the loose strap as the turnbuckle is rotated in the first direction for tightening the device and securing and holding down the cargo and the like, and further thereby locking the loose strap in place; further wherein rotation of the turnbuckle in a second loosening direction rotates the internally-threaded portion of the longitudinal bore concomitantly therewith, such that the threaded portion of the first hook is at least partially progressively removed from the longitudinal bore as the loose strap is unwrapped from around the stationary strap, whereby the device is progressively lengthened and further so that the loose strap is unwrapped from around the stationary strap, thereby progressively lengthening the loose strap as the turnbuckle is rotated in the second direction for untightening the device without a sudden loss of energy and safely unsecuring and releasing the cargo and the like; and the internally-threaded portion of the longitudinal bore includes at least one square flat portion which becomes threaded as the threaded portion of the first hook is initially inserted therethrough, whereby a self-threaded portion is defined within the longitudinal bore which places a drag on the movement of the first hook, thereby serving as a "friction lock" to keep the turnbuckle from untightening, and further thereby assisting in the first hook "backing off" if the device is overtightened, so that the loose strap unwinds to a point where the device is still exerting pressure but is not overextended.

17. A tie-down device for securing and holding down cargo and the like, the tie-down device comprising: a turnbuckle having a first end and a second opposite end, the first end of the turnbuckle having a longitudinal bore formed therein, the longitudinal bore of the turnbuckle including an internally-threaded portion; a strap having a first end secured to the second opposite end of the turnbuckle, the strap further having a second end being secured to the second opposite end of the turnbuckle, such that the strap loops back on itself at an intermediate portion between the first and second ends thereof, thereby defining a stationary strap between the first end of the strap that is secured to the turnbuckle and the intermediate portion of the strap and a loose strap between the second end of the strap that is secured to the turnbuckle and the intermediate portion of the strap; the second end of the strap being adjustably secured to the second end of the turnbuckle, such that the length of the strap may be adjusted as desired, so as to precisely fit the dimensions of the cargo and the like to be secured and held-down; a J-hook carried by the first end of the turnbuckle, the J-hook including a hook portion that may be removably hooked on either the cargo and the like to be secured and held down or on an element to which the cargo and the like is to be secured and held down, the J-hook further including an opposite portion, the opposite portion of the J-hook being externally-threaded for matingly engaging the threaded portion of the bore as the turnbuckle is rotated, so that the threaded portion of the J-hook is progressively threadably removably received through the threaded portion of the longitudinal bore and at least partially longitudinally removably received in and removed from the longitudinal bore; an S-hook carried by the intermediate portion of the strap, the S-hook including a hook portion that may be removably hooked on either the cargo and the like to be secured and held down or on an element by which the cargo and the like is to be secured and held down; wherein rotation of the turnbuckle in a first tightening direction rotates the internally-threaded portion of the longitudinal bore concomitantly therewith, so that the threaded portion of the J-hook is at least partially progressively received in the longitudinal bore including the internally-threaded portion thereof, and further so that the loose strap is wrapped around the stationary strap, thereby progressively shortening the loose strap as the turnbuckle is rotated in the first direction for tightening the device and securing and holding down the cargo and the like, and further thereby locking the loose strap in place; and further wherein rotation of the turnbuckle in a second loosening direction rotates the internally-threaded portion of the longitudinal bore concomitantly therewith, such that the threaded portion of the J-hook is at least partially progressively removed from the longitudinal bore as the loose strap is unwrapped from around the stationary strap, whereby the device is progressively lengthened and further so that the loose strap is unwrapped from around the stationary strap, thereby progressively lengthening the loose strap as the turnbuckle is rotated in the second direction for untightening the device without a sudden loss of energy and safely unsecuring and releasing the cargo and the like; and the internally-threaded portion of the longitudinal bore including at least one square flat portion which becomes threaded as the threaded portion of the J-hook is initially inserted therethrough, whereby a self-threaded portion is defined within the longitudinal bore which places a drag on the movement of the J-hook, thereby serving as a "friction lock" to keep the turnbuckle from untightening, and further thereby assisting in the first hook "backing off" if the device is overtightened, so that the loose strap unwinds to a point where the device is still exerting pressure but is not overextended.

18. A tie-down device for securing and holding down cargo and the like, the tie-down device comprising: a turnbuckle having a first end and a second opposite end, the first end of the turnbuckle having a longitudinal bore formed therein; a threaded nut interposed in the longitudinal bore, such that rotation of the turnbuckle concomitantly rotates the threaded nut therewith; a strap having a first end secured to the turnbuckle, the strap further having a second end being secured to the turnbuckle, such that the strap loops back on itself at an intermediate portion between the first and second ends thereof, thereby defining a stationary strap between the first end of the strap that is secured to the turnbuckle and the intermediate portion of the strap and a loose strap between the second end of the strap that is secured to the turnbuckle and the intermediate portion of the strap; a J-hook carried by the first end of the turnbuckle, the J-hook including a hook portion that may be removably hooked on either the cargo and the like to be secured and held down or on an element to which the cargo and the like is to be secured and held down, the J-hook further including an opposite portion, the opposite portion of the J-hook being externally-threaded for matingly engaging the threaded nut in the bore as the turnbuckle is rotated, so that the threaded portion of the J-hook is progressively threadably removably received through the threaded nut in the longitudinal bore and at least partially longitudinally removably received in and removed from the longitudinal bore; an S-hook carried by the intermediate portion of the strap, the S-hook including a hook portion that may be removably hooked on either the cargo and the like to be secured and held down or on an element by which the cargo and the like is to be secured and held down; wherein rotation of the turnbuckle in a first tightening direction rotates the threaded nut concomitantly therewith, such that the threaded portion of the J-hook is at least partially progressively received in the longitudinal bore including the threaded nut interposed therein, and further such that the loose strap is wrapped around the stationary strap, thereby progressively shortening the loose strap as the turnbuckle is rotated in the first direction for tightening the device and securing and holding down the cargo and the like, and further thereby locking the loose strap in place; and further wherein rotation of the turnbuckle in a second loosening direction rotates the threaded nut concomitantly therewith, so that the threaded portion of the J-hook is at least partially progressively removed from the longitudinal bore as the loose strap is unwrapped from around the stationary strap, whereby the device is progressively lengthened and further so that the loose strap is unwrapped from around the stationary strap, thereby progressively lengthening the loose strap as the turnbuckle is rotated in the second direction for untightening the device without a sudden loss of energy and safely unsecuring and releasing the cargo and the like.

19. A tie-down device for securing and holding down cargo and the like, the tie-down device comprising: a turnbuckle having a first end and a second opposite end, the first end of the turnbuckle having a longitudinal bore formed therein; a threaded nut interposed in the longitudinal bore, such that rotation of the turnbuckle concomitantly rotates the threaded nut therewith; a strap having a first end secured to the second end of the turnbuckle, the strap further having a second end being secured to the second end of the turnbuckle, such that the strap loops back on itself at an intermediate portion between the first and second ends thereof, thereby defining a stationary strap between the first end of the strap that is secured to the turnbuckle and the intermediate portion of the strap and a loose strap between the second end of the strap that is secured to the turnbuckle and the intermediate portion of the strap; a J-hook carried by the first end of the turnbuckle, the J-hook including a hook portion that may be removably hooked on either the cargo and the like to be secured and held down or on an element to which the cargo and the like is to be secured and held down, the J-hook further including an opposite portion, the opposite portion of the J-hook being externally-threaded for matingly engaging the threaded nut in the bore as the turnbuckle is rotated, so that the threaded portion of the J-hook is progressively threadably removably received through the threaded nut in the longitudinal bore and at least partially longitudinally removably received in and removed from the longitudinal bore; an S-hook carried by the intermediate portion of the strap, the S-hook including a hook portion that may be removably hooked on either the cargo and the like to be secured and held down or on an element by which the cargo and the like is to be secured and held down; wherein rotation of the turnbuckle in a first tightening direction rotates the threaded nut concomitantly therewith, such that the threaded portion of the J-hook is at least partially progressively received in the longitudinal bore including the threaded nut interposed therein, and further such that the loose strap is wrapped around the stationary strap, thereby progressively shortening the loose strap as the turnbuckle is rotated in the first direction for tightening the device and securing and holding down the cargo and the like, and further thereby locking the loose strap in place; and further wherein rotation of the turnbuckle in a second loosening direction rotates the threaded nut concomitantly therewith, so that the threaded portion of the J-hook is at least partially progressively removed from the longitudinal bore as the loose strap is unwrapped from around the stationary strap, whereby the device is progressively lengthened, and further so that the loose strap is unwrapped from around the stationary strap, thereby progressively lengthening the loose strap as the turnbuckle is rotated in the second direction for untightening the device without a sudden loss of energy and safely unsecuring and releasing the cargo and the like.

20. A tie-down device for securing and holding down cargo and the like, the tie-down device comprising: a turnbuckle having a first end and a second opposite end, the first end of the turnbuckle having a longitudinal bore formed therein; a threaded nut interposed in the longitudinal bore, such that rotation of the turnbuckle concomitantly rotates the threaded nut therewith; and a strap having a first end secured to the second opposite end of the turnbuckle, the strap further having a second end being secured to the second opposite end of the turnbuckle, such that the strap loops back on itself at an intermediate portion between the first and second ends thereof, thereby defining a stationary strap between the first end of the strap that is secured to the turnbuckle and the intermediate portion of the strap and a loose strap between the second end of the strap that is secured to the turnbuckle and the intermediate portion of the strap; the second end of the strap being adjustably secured to the second end of the turnbuckle, such that the length of the strap may be adjusted as desired, so as to precisely fit the dimensions of the cargo and the to be secured and held-down; a J-hook carried by the first end of the turnbuckle, the J-hook including a hook portion that may be removably hooked on either the cargo and the like to be secured and held down or on an element to which the cargo and the like is to be secured and held down, the J-hook further including an opposite portion, said opposite portion of the J-hook being threaded for matingly engaging the threaded nut as the turnbuckle is rotated, so that the threaded portion of the J-hook is progressively removably received through the threaded nut and at least partially longitudinally removably received in and removed from the longitudinal bore; wherein during rotation of the turnbuckle, including the threaded nut, in a first tightening direction, the threaded portion of the J-hook is at least partially progressively received in the longitudinal bore and through the threaded nut interposed therein as the loose strap is wrapped around the stationary strap, whereby the device is progressively shortened for tightening the device and securing and holding down the cargo and the like; and further wherein during rotation of the turnbuckle, including the threaded nut, in a second loosening direction, the threaded portion of the J-hook is at least partially progressively removed from the longitudinal bore as the strap is unwrapped from around the stationary strap, whereby the device is progressively lengthened for untightening the device and safely unsecuring and releasing the cargo and the like; an S-hook carried by the intermediate portion of the strap, the S-hook including a hook portion that may be removably hooked on either the cargo and the like to be secured and held down or on an element by which the cargo and the like is to be secured and held down; wherein rotation of the turnbuckle in the first tightening direction further wraps the loose strap around the stationary strap, thereby shortening the loose strap for tightening the device and securing and holding down the cargo and the like, and further thereby locking the loose strap in place; further wherein rotation of the turnbuckle in the second loosening direction further unwraps the loose strap from around the stationary strap, thereby lengthening the loose strap for untightening the device without a sudden loss of energy and safely unsecuring and freeing the cargo and the like; the turnbuckle having a strength and the strap having a strength, wherein the ratio of turnbuckle strength to strap strength is substantially 7:1, such that the device will fail at the strap and not at the turnbuckle; the loose strap and the stationary strap are secured to the turnbuckle, so that in the event of breakage of the strap, the stationary strap will always be the strap to break, whereby the loose strap wrapped around the stationary strap during use of the device will restrain the stationary strap in the event of breakage of the stationary strap; and the longitudinal bore further including at least one square flat portion formed therein which becomes threaded as the threaded portion of the J-hook is initially inserted therethrough, whereby a self-threaded portion is defined within the longitudinal bore which places a drag on the movement of the J-hook and which serves as a "friction lock" to keep the turnbuckle from untightening, and further assisting in the J-hook "backing off" if the device is overtightened, so that the loose strap unwinds to a point where the device is still exerting pressure but is not overextended.

21. A process for tying down cargo and the like, so that the cargo and the like is secured and held in place, the process comprised of the steps of: securing the first end and the second end of a strap to a turnbuckle, such that the strap loops back on itself at an intermediate portion between the first and second ends thereof, thereby defining a stationary strap between the first end of the strap that is secured to the turnbuckle and the intermediate portion of the strap and a loose strap between the second end of the strap that is secured to the turnbuckle and the intermediate portion of the strap; securing the turnbuckle to either the cargo and the like to be held down or on an element to which the cargo and the like is to be secured; securing the intermediate portion of the strap to either the cargo and the like to be held down or on an element to which the cargo and the like is to be secured; rotating the turnbuckle in a first tightening direction, wherein the loose strap is wrapped around the stationary strap, thereby shortening the loose strap and tightening, securing and holding down the cargo and the like, and further thereby locking the loose strap in place; and rotating the turnbuckle in a second untightening direction, wherein the loose strap is unwrapped from around the stationary strap, thereby lengthening the loose strap and loosening, unsecuring and releasing the cargo and the like without a sudden loss of energy.

* * * * *